(12) United States Patent
Sasaki

(10) Patent No.: US 8,213,109 B2
(45) Date of Patent: Jul. 3, 2012

(54) LIBRARY STORAGE APPARATUS HAVING MAINTENANCE PROGRAM TO DETECT REMOVAL OF A DRIVE DEVICE AND MOVE A ROBOT TO CLOSE THE LOAD PORT OF THE REMOVED DRIVE

(75) Inventor: Shinobu Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 12/644,768

(22) Filed: Dec. 22, 2009

(65) Prior Publication Data
US 2010/0195245 A1 Aug. 5, 2010

(30) Foreign Application Priority Data
Feb. 4, 2009 (JP) ................................. 2009-23304

(51) Int. Cl.
G11B 15/68 (2006.01)
G11B 21/08 (2006.01)
(52) U.S. Cl. ........................ 360/92.1; 369/34.1; 711/112
(58) Field of Classification Search ................. 360/92.1; 369/33.01–34.01; 711/111–115
See application file for complete search history.

(56) References Cited

U.S. PATENT DOCUMENTS
4,814,592 A * 3/1989 Bradt et al. .................... 235/381
5,761,032 A 6/1998 Jones FOREIGN PATENT DOCUMENTS
JP 9-82081 3/1997
JP 2007-172735 7/2007
* cited by examiner Primary Examiner — Allen Heinz
(74) Attorney, Agent, or Firm — Staas & Halsey LLP

(57) ABSTRACT

A storage apparatus includes at least one device insertion section, at least one robot, a replacement detection section, a first determination section, and a movement section. A device can be inserted into the device insertion section. The robot has a moving mechanism. The replacement detection section detects a start of the replacement of the device. When it is detected by the replacement detection section that the replacement of the device is started, the first determination section determines a position of the device insertion section at which the device is replaced. The movement section moves the robot so as to close an opening formed by removal of the device from the device insertion section based on the determination result of the first determination section.

12 Claims, 12 Drawing Sheets

FIG. 8

|  | HORIZONTAL AXIS | VERTICAL AXIS |
|---|---|---|
| HAND 151A | Ux | Uy |
| HAND 151B | Lx | Ly |
| OBJECT CELL 16C | Cx | Cy |

LIBRARY STORAGE APPARATUS HAVING MAINTENANCE PROGRAM TO DETECT REMOVAL OF A DRIVE DEVICE AND MOVE A ROBOT TO CLOSE THE LOAD PORT OF THE REMOVED DRIVE

CROSS-REFERENCE TO RELATED APPLICATIONS

This application is based upon and claims the benefit of priority of the prior Japanese Patent Application No. 2009-23304, filed on Feb. 4, 2009, the entire contents of which are incorporated herein by reference.

BACKGROUND

1. Field

Embodiment(s) described herein relate to a storage apparatus including a plurality of storage media for storing data, a device, and a robot having a movement mechanism, a maintenance method of the storage apparatus, and a computer-readable medium having a maintenance program of the storage apparatus.

2. Description of the Related Art

Conventionally, in the maintenance work of devices, such as a drive included in a tape library apparatus, many techniques to improve working efficiency have been used.

In a library computer system having a plurality of drives, a technique, in which a normal drive can be accessed even during repair of a failed drive, is discussed, for example, in Japanese Patent Laid-Open No. 09-082081. Further, a technique, in which in the active replacement of a robot of a tape library apparatus, a robot retreated to a garage due to a failure is detected, and in which a maintenance cover is opened and closed by cutting off power, is discussed, for example, in Japanese Patent Laid-Open No. 2007-172735.

However, when maintenance work, such as drive replacement, is performed in the tape library apparatus, the operation of all the robots is stopped in order to prevent contact between an operator and the robot in operation. Therefore, the robots are stopped for each maintenance work. As a result, even when an instruction requiring operation of the robot is issued from a host, the tape library apparatus cannot execute the instruction, and thereby the working efficiency is lowered.

SUMMARY

According to an aspect of the invention, a storage apparatus includes at least one device insertion section, at least one robot, a replacement detection section, a first determination section, and a movement section. A device can be inserted into the device insertion section. The robot has a moving mechanism. The replacement detection section detects the start of the replacement of the device. When it is detected by the replacement detection section that the replacement of the device is started, the first determination section determines a position of the device insertion section at which the device is replaced. The movement section moves the robot so as to close an opening formed by a removal of the device from the device insertion section on the basis of the determination result of the first determination section.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 is a diagram representing position coordinates of hands of robots in a tape library apparatus according to an embodiment;

DETAILED DESCRIPTION

Figure 1:
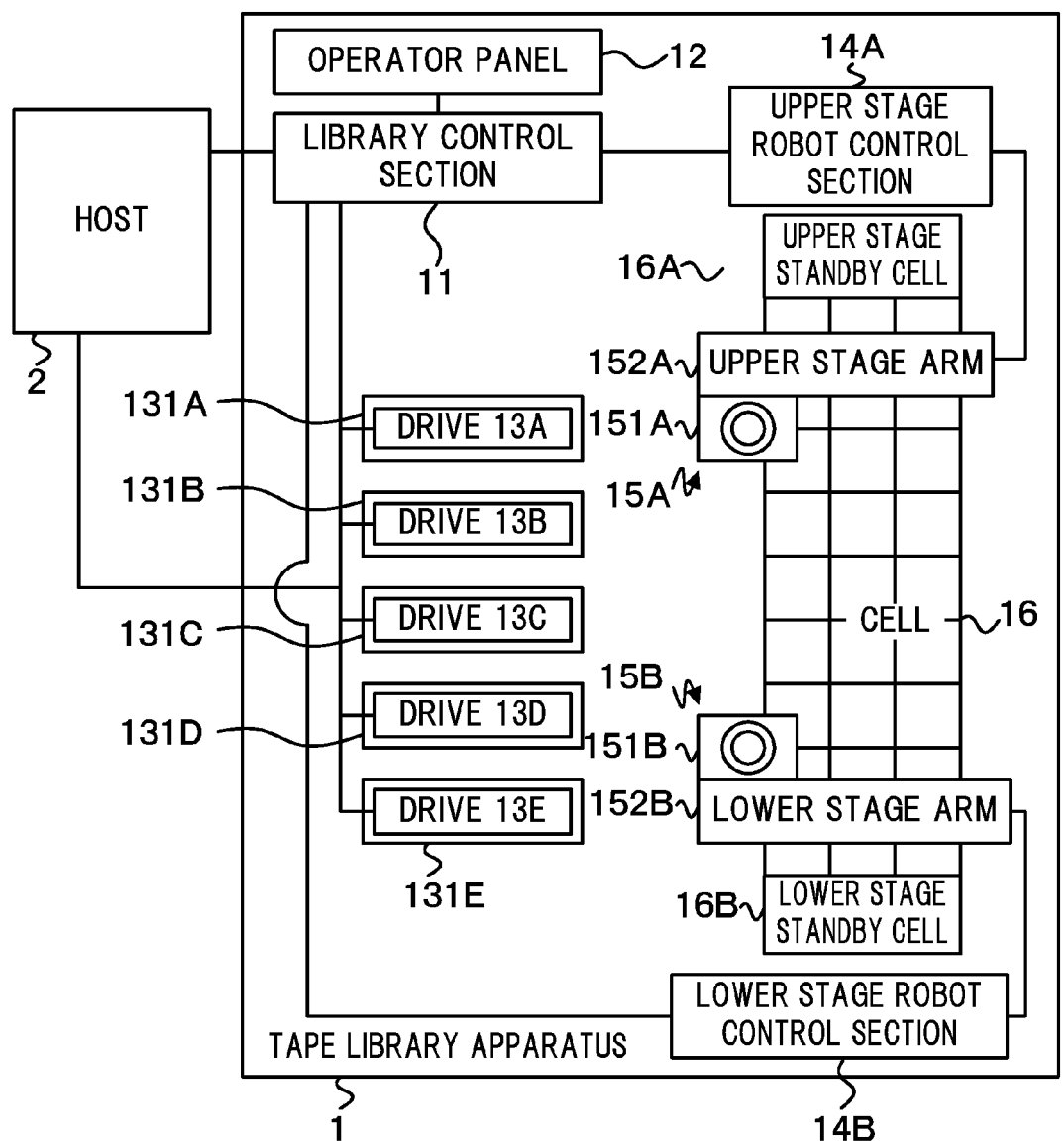
FIG. 1 is a block diagram illustrating an example of a configuration of a tape library apparatus according to an embodiment.

Reference will now be made in detail to the embodiments, examples of which are illustrated in the accompanying drawings, wherein like reference numerals refer to the like elements throughout. The embodiments are described below to explain the present invention by referring to the figures.

In the following, an embodiment according to the present invention will be described with reference to the accompanying drawings.

A configuration of a tape library apparatus according to an embodiment will be described with reference to FIGS. 1 to 3.

FIG. 1 is a block diagram illustrating an example of a configuration of a tape library apparatus according to an embodiment. As illustrated in FIG. 1, a tape library apparatus 1 includes a library control section 11, an operator panel 12, drives 13A to 13E (devices), load ports 131A to 131E (device insertion sections), an upper stage robot control section 14A, a lower stage robot control section 14B, an upper stage robot 15A, a lower stage robot 15B, a cell 16 (storage section), an upper stage standby cell 16A, and a lower stage standby cell 16B. Further, the tape library apparatus 1 is connected to a host 2.

The library control section 11 performs overall control of the tape library apparatus 1. Note that the detail of the library control section 11 is described in detail below.

The operator panel 12 may be a touch panel type device with which an operator can manually perform control, and the like, of the tape library apparatus 1. Further, with the operator panel 12, the operator can confirm information about the tape library apparatus 1, such as information on what kind of cartridge is stored in the cell 16, and information on the drives 13A to 13E.

Each of the drives 13A to 13E reads data stored in a mounted physical tape (a storage medium which is hereinafter referred to as a cartridge) to transfer the read data to the host 2, and writes data transferred from the host 2 into the cartridge. Further, the drives 13A to 13E are respectively loaded to the load ports 131A to 131E in a manner of being vertically stacked. Thus, the drives 13A to 13E can be respectively removed from the load ports 131A to 131E, so as to be replaced. Note that when the drives 13A to 13E are described without being discriminated from each other, each of the drives 13A to 13E is generally referred to as a drive 13. Further, in an embodiment, five drives 13 are provided, but the number of the drives 13 is not limited to five. Any number of drives may be provided without problem.

The drives 13A to 13E can be inserted into the load ports 131A to 131E. Note that when the load ports 131A to 131E are described without being discriminated from each other, each of the load ports 131A to 131E is generally referred to as a load port 131. Further, an opening is formed when the drive 13 is removed from the load port 131, and the opening allows the space of the load port 131 to communicate with the space in which the upper stage robot 15A and the lower stage robot 15B are operated. The opening can be closed in such a manner that the upper stage robot 15A or the lower stage robot 15B is moved so as to close the load port 131.

The upper stage robot control section 14A controls the drive of the upper stage robot 15A on the basis of an instruction from the library control section 11, while the lower stage robot control section 14B controls the drive of the lower stage robot 15B on the basis of an instruction from the library control section 11. Note that when the upper stage robot control section 14A and the lower stage robot control section 14B are described without being discriminated from each other, each of the upper and lower stage robot control sections is generally referred to as a robot control section 14.

The upper stage robot 15A is a device installed in the upper stage, and has an upper stage hand 151A (horizontal movement section) and an upper stage arm 152A (vertical movement section). The upper stage hand 151A has a mechanism for horizontal and rotational drive, and for grasping the cartridge stored in the cell 16, while the upper stage arm 152A has a mechanism for vertical drive. Further, according to an instruction from the upper stage robot control section 14A, the upper stage robot 15A mounts the cartridge to the drive 13 and dismounts the cartridge mounted in the drive 13. The lower stage robot 15B is a device installed in the lower stage, and has a lower stage hand 151B (horizontal movement section) and a lower stage arm 152B (vertical movement section). Here, the lower stage hand 151B and the lower stage arm 152B are respectively the same mechanisms as the upper stage hand 151A and the upper stage arm 152A, and hence the explanation thereof is omitted. The lower stage robot 15B also performs the same operations as the upper stage robot 15A described above, according to an instruction from the lower stage robot control section 14B.

The cell 16 is a storage place where each of the plurality of cartridges is separately stored. The upper stage standby cell 16A and the lower stage standby cell 16B are places where a cartridge is temporarily stored at the time when the cartridge cannot be returned to the original place. Note that the upper stage standby cell 16A is a place exclusively used by the upper stage robot 15A, while the lower stage standby cell 16B is a place exclusively used by the lower stage robot 15B. The upper stage standby cell 16A and the lower stage standby cell 16B are enabled to be independently operated. Further, the place in the cell 16, in which place the cartridge is stored, and the kind of the cartridge stored at the place in the cell are managed by the library control section 11.

Figure 2:
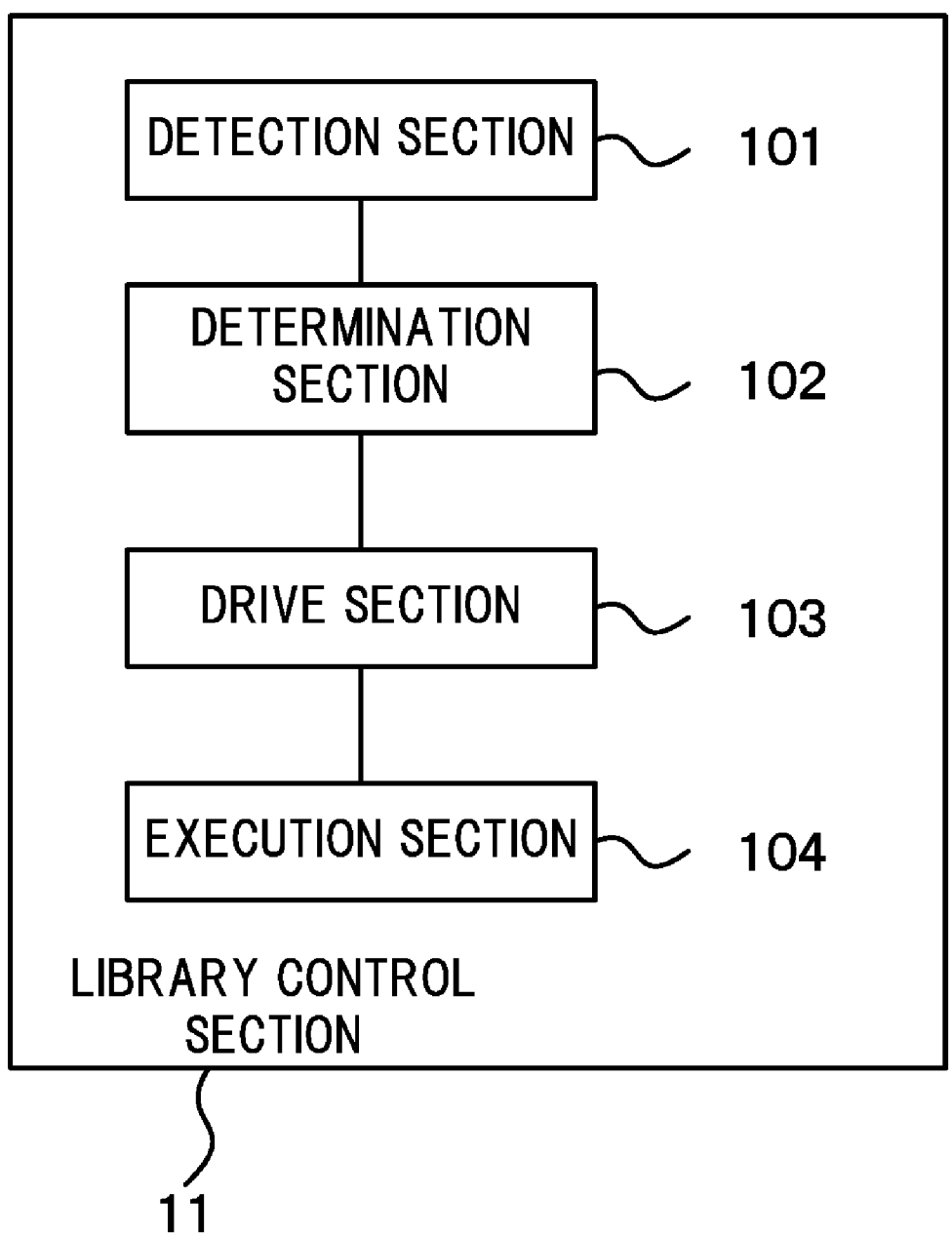
FIG. 2 is a diagram illustrating an example of function blocks of a library control section according to an embodiment.

FIG. 2 is a diagram illustrating an example of function blocks of the library control section according to an embodiment. As illustrated in FIG. 2, the library control section 11 includes a detection section 101 (a replacement detection section, a reception section), a determination section 102 (a first determination section, a second determination section, a third determination section, a fourth determination section, a fifth determination section, a sixth determination section, a seventh determination section), a drive section 103 (a movement section, a switch section), and an execution section 104 (an instruction execution section).

The detection section 101 detects removal and attachment of the drive 13, and receives an instruction from the host 2. When it is detected by the detection section 101 that one of the drives 13 is removed, the determination section 102, the drive section 103, and the execution section 104 perform maintenance processing as is described in detail below.

From the position of the load port 131 with the drive 13 removed therefrom, the determination section 102 determines the load port 131 to which the removed drive 13 was loaded. Further, when receiving a data read instruction or a data write instruction from the host 2 in a state where one of the drives 13 is removed, the determination section 102 determines whether or not the cartridge and the drive 13, which has the read/write area for the data read instruction or a data write instruction from the host 2, are in the data read/write enable state.

The drive section 103 instructs the robot control section 14 to drive the upper stage robot 15A and the lower stage robot 15B, or to set the upper stage robot 15A and the lower stage robot 15B in a standby state.

The execution section 104 responds to the instruction from the host 2. Further, when receiving from the host 2 an instruction to access the removed drive 13, the execution section 104 adds the instruction to a table having a queue structure (storage area, and hereinafter referred to as queuing table). Note that when more than a predetermined time has elapsed after the addition of the instruction received from the host 2 to the queuing table, the drive section 103 performs robot switch processing. The details of the robot switch processing are described in detail below.

Figure 3:
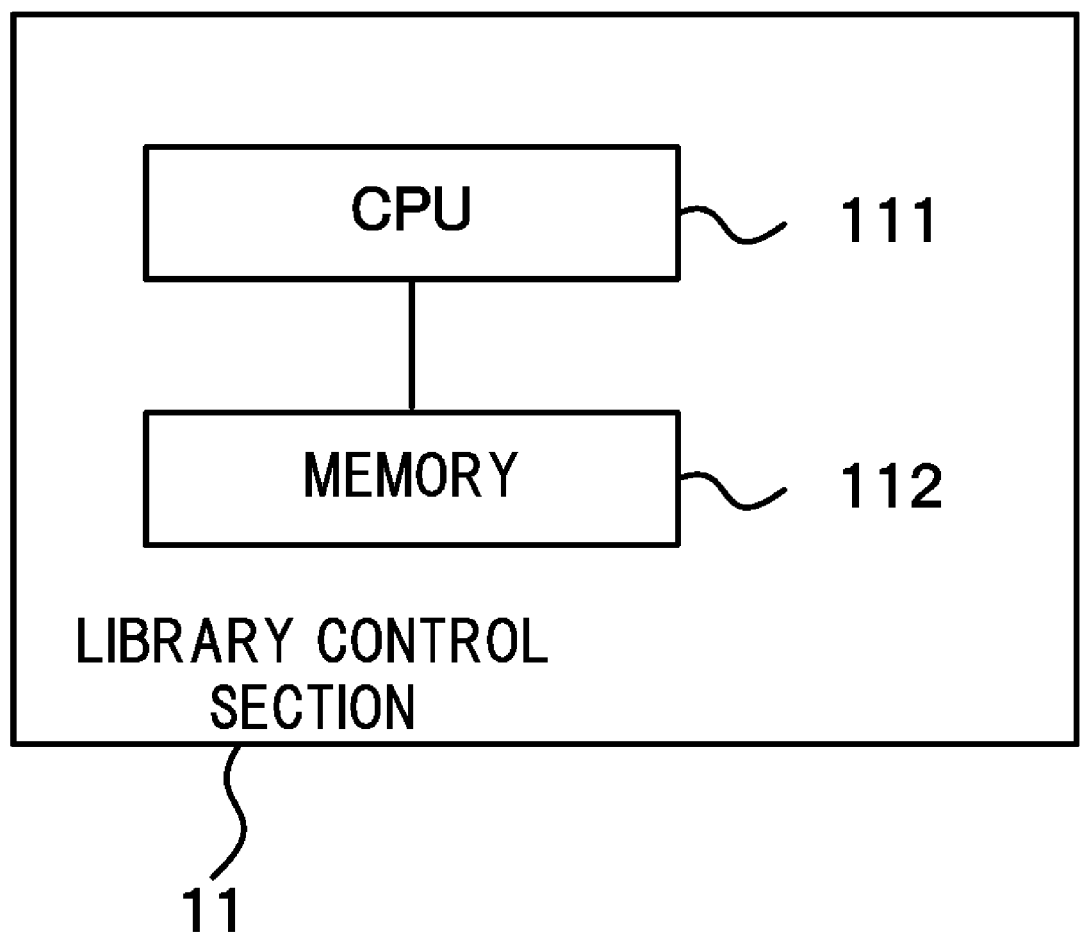
FIG. 3 is a block diagram illustrating an example of a configuration of a library control section according to an embodiment.

FIG. 3 is a block diagram illustrating an example of a configuration of a library control section according to an embodiment. As illustrated in FIG. 3, the library control section 11 includes a CPU (Central Processing Unit) 111 and a memory 112. Each of the function blocks described above can be realized in such a manner that the CPU 111 performs an arithmetic operation by reading a program stored in the memory 112.

Next, an operation of the tape library apparatus according to an embodiment will be described.

Figure 4:
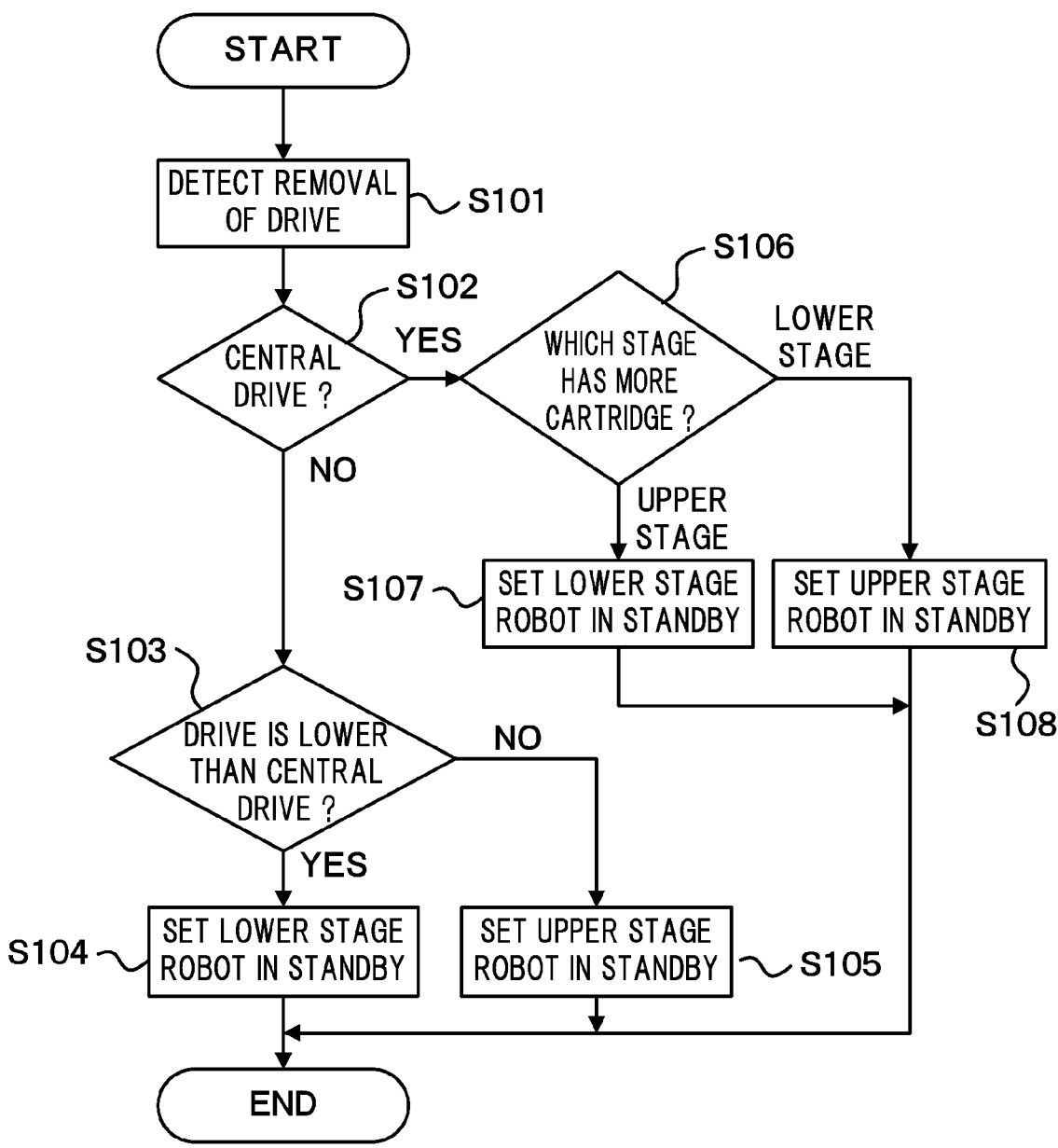
FIG. 4 is a flow chart illustrating an example of an operation of maintenance processing in a tape library apparatus according to an embodiment.

FIG. 4 is a flow chart illustrating an example of an operation of maintenance processing in the tape library apparatus according to an embodiment. First, when one of the drives 13 is removed from the load port 131 by the operator, the detection section 101 detects that one of the drives 13 is removed (S101). After the detection, the determination section 102 determines whether or not the drive 13 which is removed (hereinafter referred to as removed drive) is a drive that is at a center position among the drives 13A to 13E, referred to as a central drive.

When determining that the removed drive is not the central drive of the drives 13A to 13E (S102, NO), the determination section 102 determines whether or not the removed drive is a drive loaded at a position lower than the central drive of the drives 13A to 13E (S103). When it is determined that the removed drive is a drive loaded at a position lower than the central drive of the drives 13A to 13E (S103, YES), the lower stage robot 15B is moved and set in the standby state by the drive section 103 so as to close the load port 131 of the removed drive (S104), and the processing flow is ended.

On the other hand, when it is determined that the removed drive is not a drive loaded at a position lower than the central drive of the drives 13A to 13E (S103, NO), the upper stage robot 15A is moved and set in the standby state by the drive section 103 so as to close the load port 131 of the removed drive (S105), and the processing flow is ended.

When it is determined that the removed drive is the drive 13C loaded as the central drive of the drives 13A to 13E (S102, YES), the determination section 102 determines in which of the upper and lower stages of the cell 16 with respect to the load port 131 of the removed drive, the number of stored effective cartridges is larger (S106). Note that information indicating at which position of the cell 16 a cartridge is stored is held in the memory 112, and the determination section 102 performs the determination on the basis of the cartridge position information. When it is determined that more effective cartridges are stored in the upper stage of the cell 16 (S106, upper stage), the lower stage robot 15B is moved and set in the standby state by the drive section 103 so as to close the load port 131 of the removed drive (S107), and the processing flow is ended.

When it is determined that more effective cartridges are stored in the lower stage of the cell 16 (S106, lower stage), the upper stage robot 15A is moved and set in the standby state by the drive section 103 so as to close the load port 131 of the removed drive (S108), and the processing flow is ended.

Next, there will be described an operation of the tape library apparatus according to an embodiment in the case where the tape library apparatus receives from the host 2 mount and dismount instructions, and the like, which include access to the drive 13 and the cell 16, during the maintenance processing of the tape library apparatus. Here, it is assumed that the removed drive in an embodiment is the drive 13B, and first, a configuration of the tape library apparatus performing the maintenance processing is described in detail below.

Figure 5:
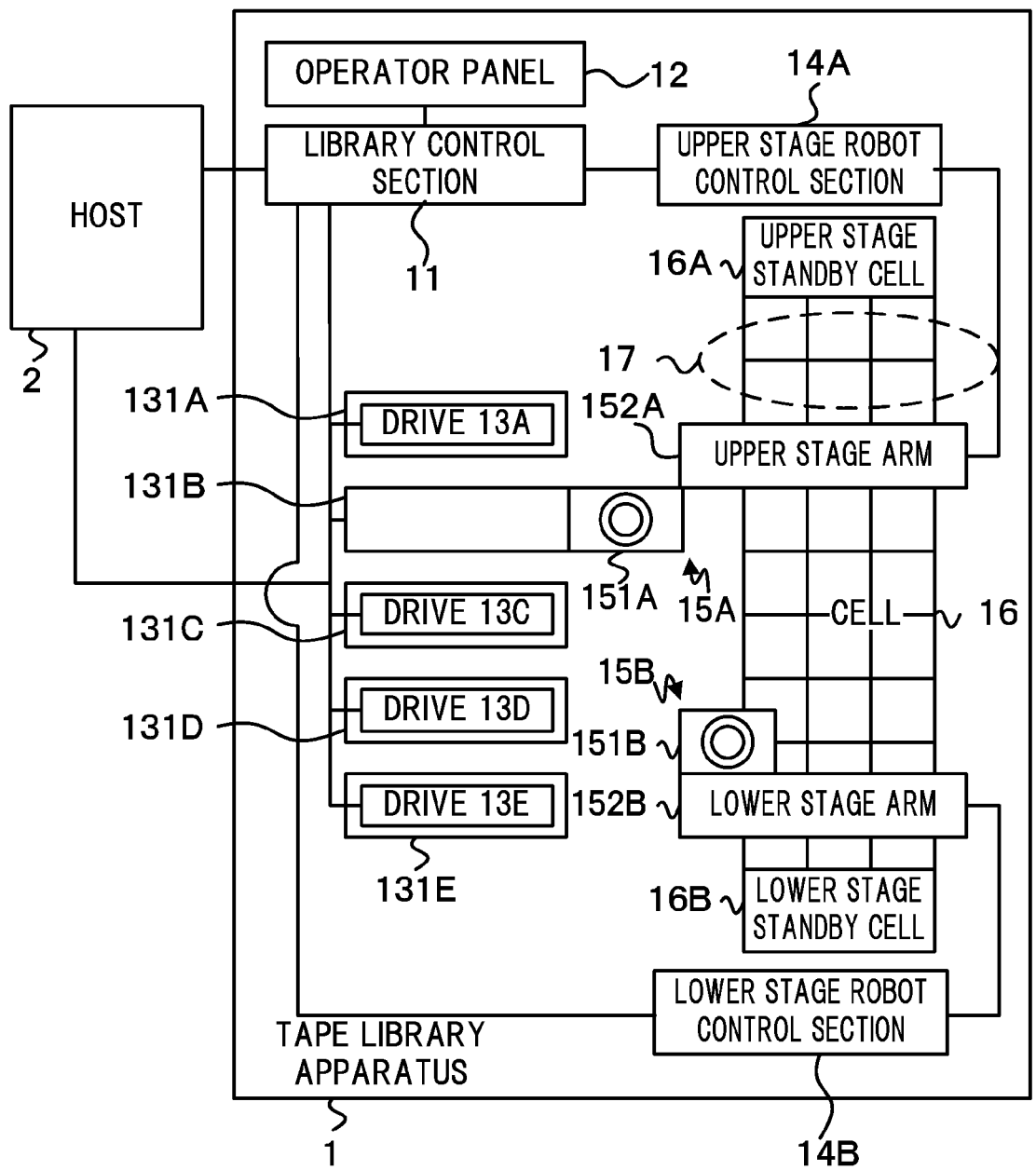
FIG. 5 is a block diagram illustrating an example of a configuration of a tape library apparatus during a maintenance processing according to an embodiment.

FIG. 5 is a block diagram illustrating an example of a configuration of the tape library apparatus during a maintenance processing according to an embodiment. Note that the same reference numerals and characters as those in FIG. 1 denote the same or equivalent portions, and the duplicating explanation thereof is omitted. As illustrated in FIG. 5, since the drive 13B is to be replaced in an embodiment, the drive 13B is removed from the load port 131B, and the load port 131B is closed by the upper stage robot 15A. Note that since the load port 131B of the drive 13B is closed by the upper stage robot 15A set in the standby state, the drive 13A and the region in the cell 16, which region is denoted by reference numeral 17, are set as an inaccessible region to which the lower stage robot 15B cannot be moved.

Figure 6:
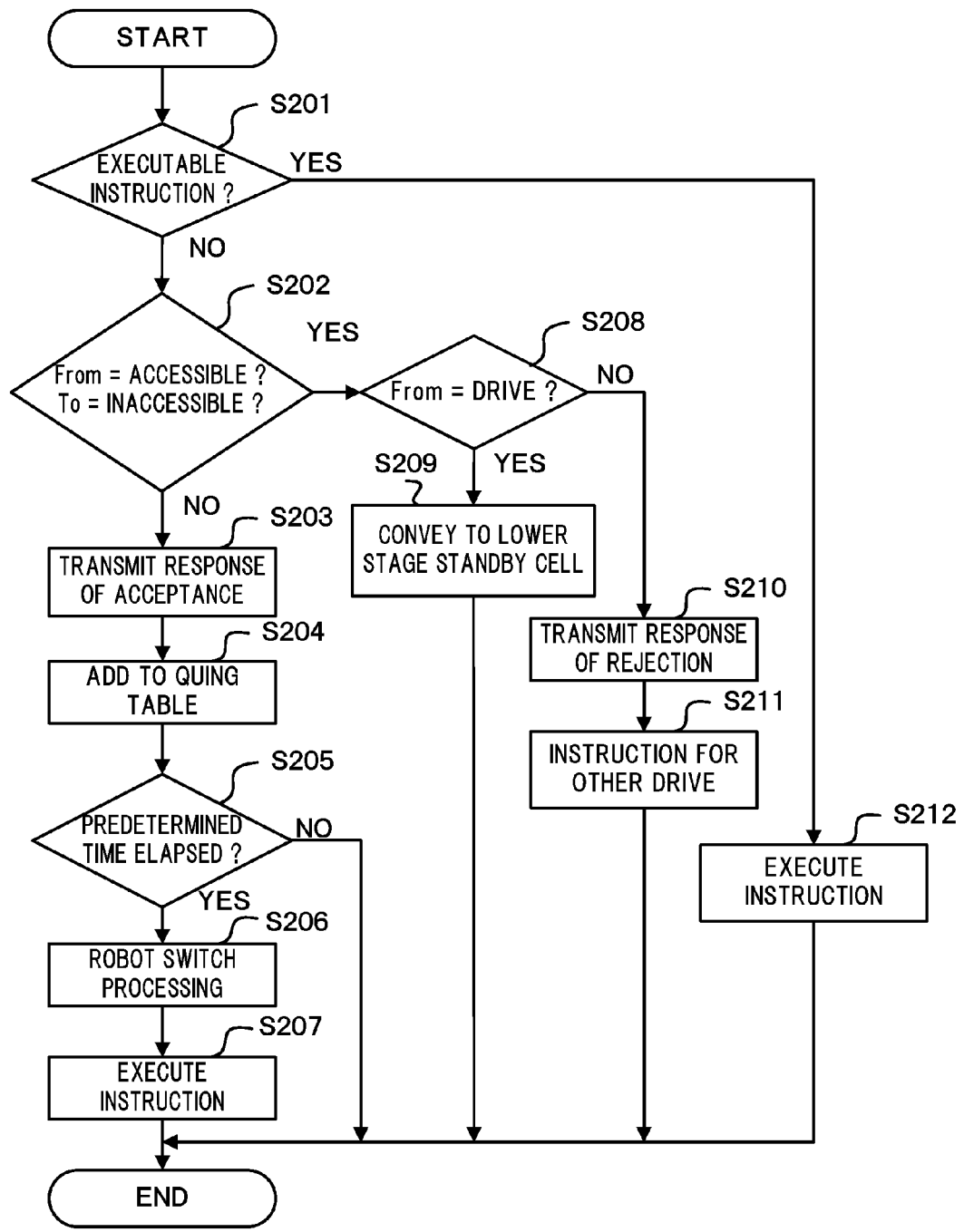
FIG. 6 is a flow chart illustrating an example of an operation to process an instruction from a host in a tape library apparatus during a maintenance process according to an embodiment.

FIG. 6 is a flow chart illustrating an example of an operation for processing an instruction from the host in the tape library apparatus during the maintenance processing according to an embodiment. First, when an instruction including conveyance of a cartridge to the drive 13 and the cell 16 is received by the detection section 101 from the host 2, the determination section 102 determines whether or not the received instruction can be executed during the maintenance processing (S201). That is, the determination section 102 determines whether or not the received instruction is an instruction to access the drives 13C to 13E and the cell 16 which are in the region accessible by the lower stage hand 151B of the lower stage robot 15B that is not set in the standby state.

When the received instruction is not an instruction which can be executed during the maintenance processing (S201, NO), the determination section 102 determines whether or not the received instruction is an instruction according to which "From" can be accessed by the lower stage hand 151B, and according to which "To" cannot be accessed by the lower stage hand 151B (S202). Here, "From" is an object to be accessed by the lower stage hand 151B, and designates the drive 13 or the cell 16 as the conveyance origin of the cartridge. Further, "To" is an object to be accessed by the lower stage hand 151B, and designates the drive 13 or the cell 16 as the conveyance destination of the cartridge. That is, the determination section 102 determines whether or not the received instruction is an instruction to convey the cartridge from the cell 16 or the drives 13C to 13E which are in the region accessible by the lower stage hand 151B to the cell 16 or the drives 13C to 13E which are in the region inaccessible by the lower stage hand 151B.

When the received instruction is not the instruction according to which "From" can be accessed by the lower stage hand 151B, and according to which "To" cannot be accessed by the lower stage hand 151B (S202, NO), the execution section 104 transmits to the host 2 a response to accept the received instruction (S203). After the transmission of the response, the execution section 104 adds the received instruction to the queuing table (S204). After the addition of the received instruction, the determination section 102 determines whether or not a predetermined time has elapsed from the addition of the instruction received from the host 2 to the queuing table (S205). Note that the predetermined time is set to 30 minutes in an embodiment, but the predetermined time can be suitably set.

When it is determined that the predetermined time has elapsed from the addition of the instruction received from the host 2 to the queuing table (S205, YES), the drive section 103 positions the lower stage robot 15B near the upper stage robot 15A which is set in the standby state. After the positioning, the drive section 103 moves upward the upper stage robot 15A, and also moves upward the lower stage robot 15B in linkage with the movement of the upper stage robot 15A. Thereby, the drive section 103 switches the robot to be set in the standby state from the upper stage robot 15A to the lower stage robot 15B while maintaining the closed state of the load port 131B (S206). After the switching, the drive section 103 executes the instruction in the Queuing table in the order of earlier time (S207), and the processing flow is ended.

Further, when the predetermined time has not elapsed from the addition of the instruction received from the host 2 to the Queuing table (S205, NO), the processing flow is ended. Further, in the case where the received instruction is an instruction according to which "From" can be accessed by the lower stage hand 151B, and according to which "To" cannot be accessed by the lower stage hand 151B (S202, YES), the determination section 102 determines whether or not "From" is the drive 13 (S208). When "From" is the drive 13 (S208, YES), the drive section 103 stores, in the lower stage standby cell 16B, the cartridge mounted to the object drive (one of the drives 13C to 13E in an embodiment) of the received instruction (S209), and the processing flow is ended.

Further, when "From" is not the drive 13 (S208, NO), the execution section 104 determines that "From" is the cell 16, and transmits to the host 2 a response to reject the received instruction (S210). After the response of rejection, the execution section 104 instructs the host 2 to select one of the drives 13C to 13E located in the region accessible by the lower stage hand 151B (S211), and the processing flow is ended.

Further, when the received instruction is an instruction which can be executed during the maintenance processing (S201, YES), the drive section 103 performs access to the drive 13 and the cell 16 and conveyance of the cartridge according to the received instruction (S212), and the processing flow is ended.

Figure 7:
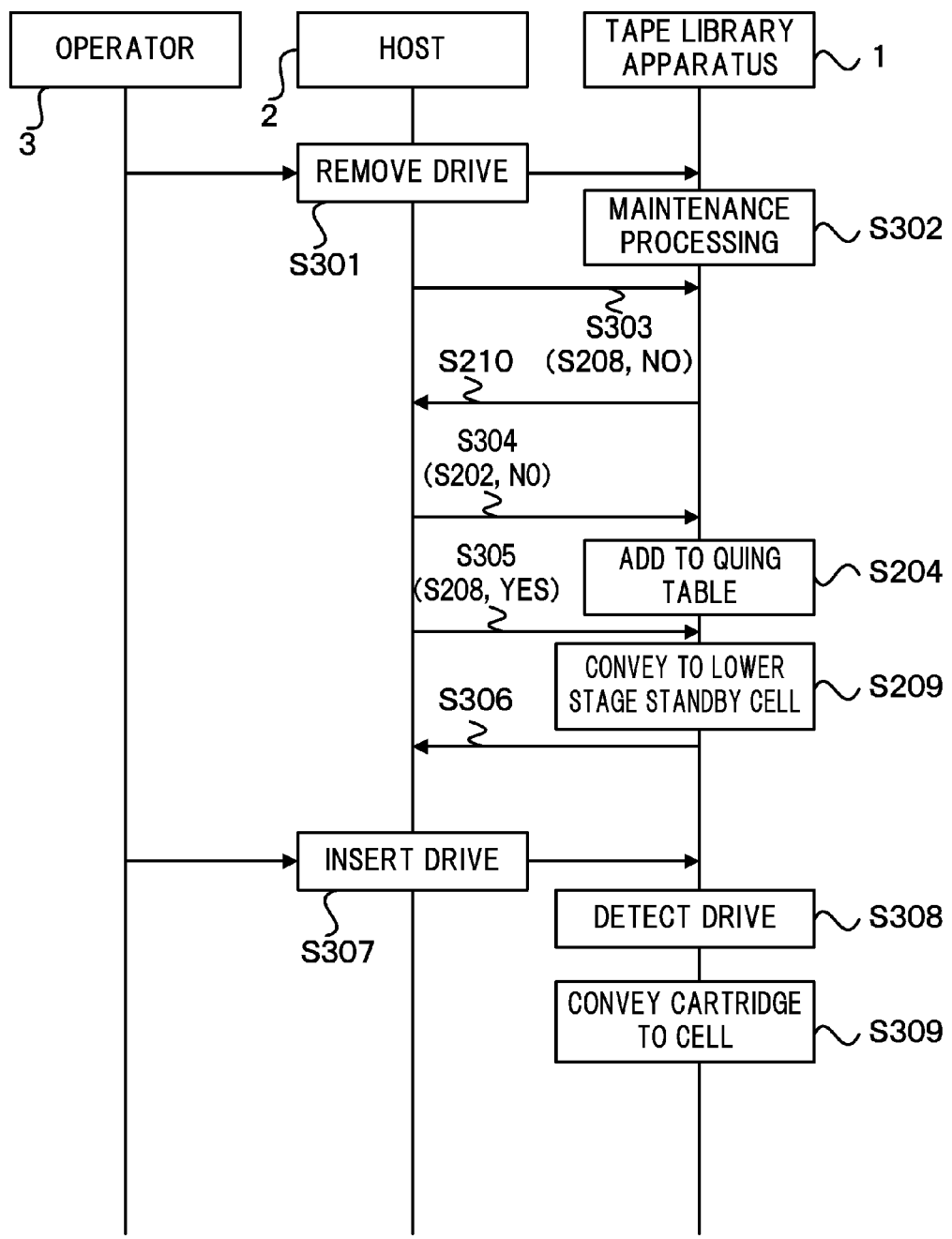
FIG. 7 is a diagram illustrating an example of a sequence from a start to an end of a maintenance processing performed between an operator, a host, and a tape library apparatus.

FIG. 7 is a diagram illustrating an example of a sequence from the start to the end of the maintenance processing performed between the operator, the host, and the tape library apparatus. As illustrated in FIG. 7, when an operator 3 removes one of the drives 13 (S301), the tape library apparatus 1 performs the maintenance processing described above (S302). After the maintenance processing, when receiving from the host 2 a mount instruction according to which the cell 16 can be accessed but the drive 13 cannot be accessed (S303), the tape library apparatus 1 transmits to the host 2 a response to reject the received instruction. That is, when receiving the instruction determined as NO in operation S208 in FIG. 6, the tape library apparatus 1 transmits to the host 2 the response to reject the received instruction (S210). Note that the operation subsequent to operation S210 is described above, and hence the description thereof is omitted here.

Further, when receiving from the host 2 an instruction according to which both "From" and "To" cannot be accessed (S304), the tape library apparatus 1 transmits to the host 2 to accept the received instruction and adds the received instruction to the Queuing table (S204). That is, when receiving the instruction determined as NO in operation S202 in FIG. 6, the tape library apparatus 1 transmits to the host 2 to accept the received instruction and adds the received instruction to the Queuing table (S204). Note that the operation subsequent to operation S204 is described in the above, and hence the description thereof is omitted here.

Further, when receiving from the host 2 a dismount instruction according to which the drive 13 can be accessed but the cell 16 cannot be accessed (S305), the tape library apparatus 1 moves the cartridge mounted to the drive 13 to the lower stage standby cell 16B (S209). That is, when receiving the instruction determined as YES in operation S208 in FIG. 6, the tape library apparatus 1 moves the cartridge mounted to the drive 13 to the lower stage standby cell 16B (S209).

After completing the instruction from the host 2 as described above, the execution section 104 transmits a completion response (S306). Next, when a replacement drive, with which the drive 13B is to be replaced, is inserted into the load port 131B from which the drive 13B was removed by the operator 3 (S307), the detection section 101 detects that the drive is replaced (S308). After the detection, the drive section 103 operates the upper stage robot 15A which is set in the standby state. When there are cartridges stored in the lower stage standby cell 16B, the drive section 103 successively stores the cartridges in the original places in the cell 16, and the processing sequence is ended.

Here, when the cell 16 to be accessed is on the same straight line as the horizontal axis of the upper stage hand 151A of the upper stage robot 15A set in the standby state, the upper stage hand 151A may be brought into contact with the lower stage hand 151B. Therefore, the tape library apparatus 1 performs drive processing at the time of driving the robot 15. Next, the drive processing will be described with reference to FIGS. 8 to 10.

FIG. 8 is a diagram representing position coordinates of the hands of the robots in the tape library apparatus according to an embodiment. As illustrated in FIG. 8, the coordinates of the upper stage hand 151A are represented by (Ux, Uy), and the coordinates of the lower stage hand 151B are represented (Lx, Ly). Also, the coordinates of the object cell 16C to be accessed are represented by (Cx, Cy).

Figure 9:
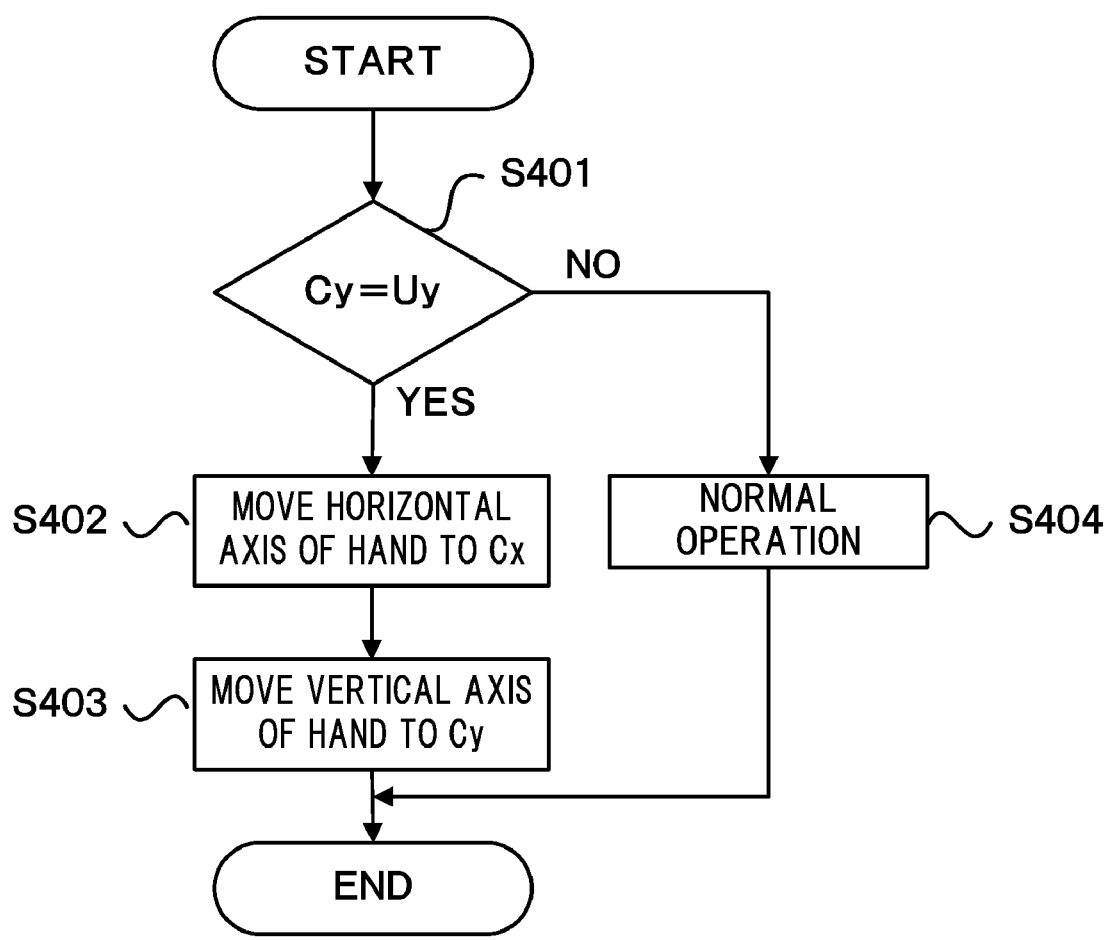
FIG. 9 is a flow chart illustrating an example of an operation of drive processing in a tape library apparatus during a maintenance processing according to an embodiment.

FIG. 9 is a flow chart illustrating an example of an operation of drive processing in the tape library apparatus during the maintenance processing according to an embodiment. As illustrated in FIG. 9, first, the determination section 102 determines whether or not Cy=Uy (S401). When it is determined that Cy=Uy (S401, YES), the drive section 103 moves the lower stage hand 151B to the coordinate position of Cx (S402), and then moves the lower stage arm 152B so as to set the lower stage hand 151B at the coordinate position of Cy (S403), and the processing flow is ended. Note that in an embodiment, the upper stage robot 15A is set in the standby state, and hence the determination section 102 determines whether or not Cy=Uy. However, when the lower stage robot 15B is set in the standby state, the determination section 102 determines whether or not Cy=Ly.

Further, except when Cy=Uy (S401, NO), the drive section 103 simultaneously moves the lower stage hand 151B and the lower stage arm 152B (S404), and the processing flow is ended. Note that it is configured such that the lower stage hand 151B and the lower stage arm 152B are moved simultaneously, but it may also be configured such that the lower stage hand 151B is moved after the movement of the lower stage arm 152B. Further, it may also be configured such that the lower stage arm 152B is moved after the movement of the lower stage hand 151B.

Figure 10:
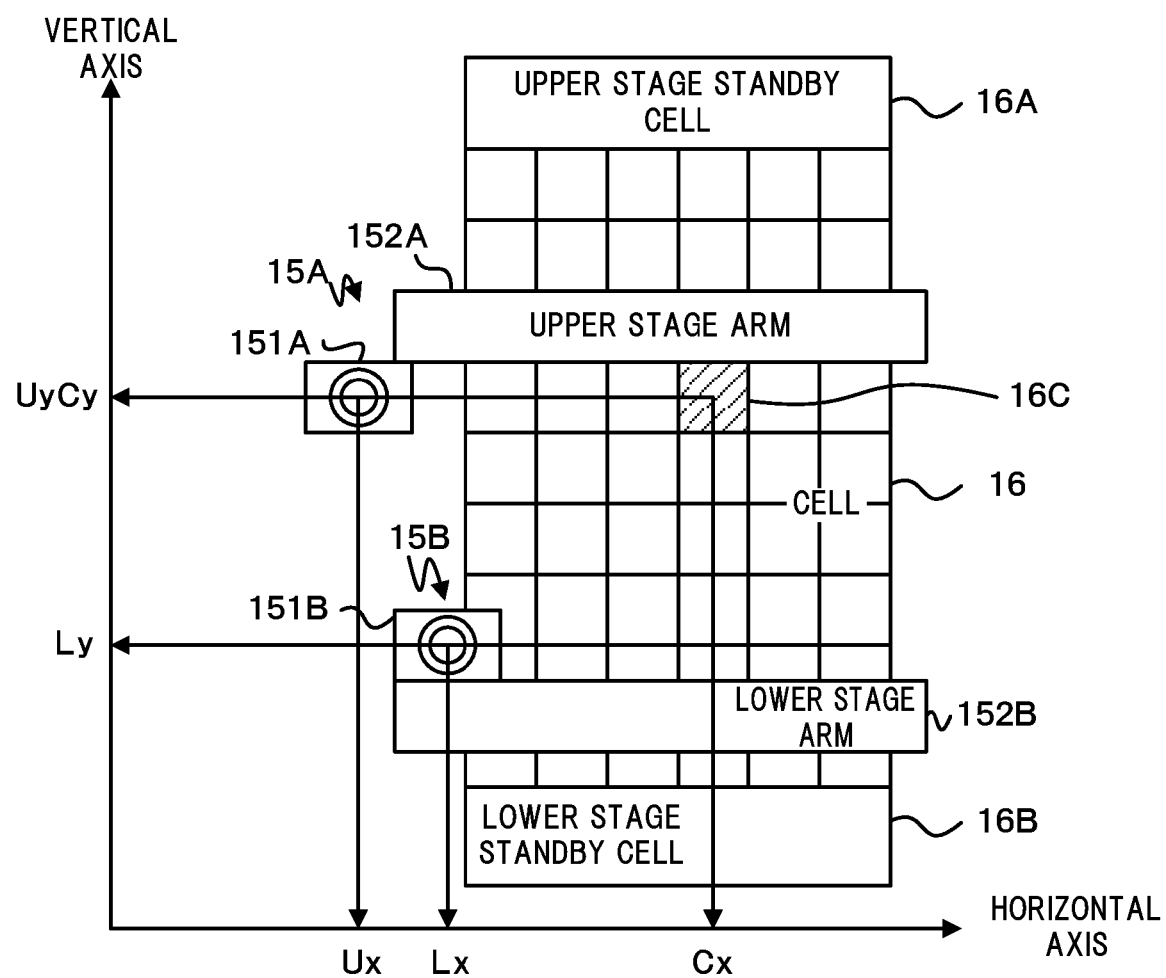
FIG. 10 is a diagram illustrating a state where a cell to be accessed is on the same straight line as a horizontal axis of a hand of a standby robot in the tape library apparatus during a maintenance processing according to an embodiment.

FIG. 10 is a diagram illustrating a state where a cell to be accessed is on the same straight line as the horizontal axis of the hand of the standby robot in the tape library apparatus during the maintenance processing according to an embodiment. Note that the same reference numerals and characters as those in FIG. 1 denote the same or equivalent portions, and the duplicating explanation thereof is omitted. As illustrated in FIG. 10, when the vertical axis coordinate value Uy of the upper stage hand 151A of the upper stage robot 15A set in the standby state is the same as the vertical axis coordinate value Cy of the cell 16C to be accessed, the drive section 103 performs the drive processing of the two operations of operation S402 and operation 403 described above. When the drive section 103 performs the drive processing of the two operations, the contact between the upper stage hand 151A and the lower stage hand 151B can be avoided.

Further, in an embodiment, it is configured such that when Cy=Uy, the drive processing of the two operations is performed. However, it may also be configured such that a predetermined threshold value is set for Cy and/or Uy, and that when the value of Cy and/or Uy is within the threshold value, the drive processing of the two operation described above is performed.

Further, in an embodiment, it is configured such that, when the detection section 101 detects that one of the drives 13 is removed, and when it is determined that the drive 13 is to be replaced, the robot 15 is moved to the load port 131 of the drive 13. However, it may also be configured such that by an operation by the operator 3 from the host 2 or the operator panel 12, the detection section 101 is made to determine the start of the replacement operation of the drive 13 and the robot 15 is made to be moved. Further, the present invention can be applied not only to the replacement of the drive 13, but also to all devices adjacent to the operation area of the robot 15 which, in operation, may be brought into contact with the operator in the case where maintenance work, such as replacement work, is performed.

According to an embodiment, the replacement of the drive 13 is detected, and the robot 15 is moved to the load port 131 so as to close the opening formed by the removal of the drive 13 from the load port 131. The robot is set in the standby state so as to close the opening until the completion of the replacement is detected. Thereby, the contact between the operator 3 and the robot 15 in operation can be prevented. Therefore, it is not necessary to stop the robot 15, and hence it is possible to set the robot 15 in an active state. Even during the maintenance work, such as drive replacement, it is possible to perform the mount and dismount processing, and the like, on the basis of the instruction from the host 2.

The present invention can be carried out in other various forms without departing from the spirit or scope of the present invention. Therefore, the above describe embodiment is only an example at all points and should not be interpreted restrictively.

Figure 11:
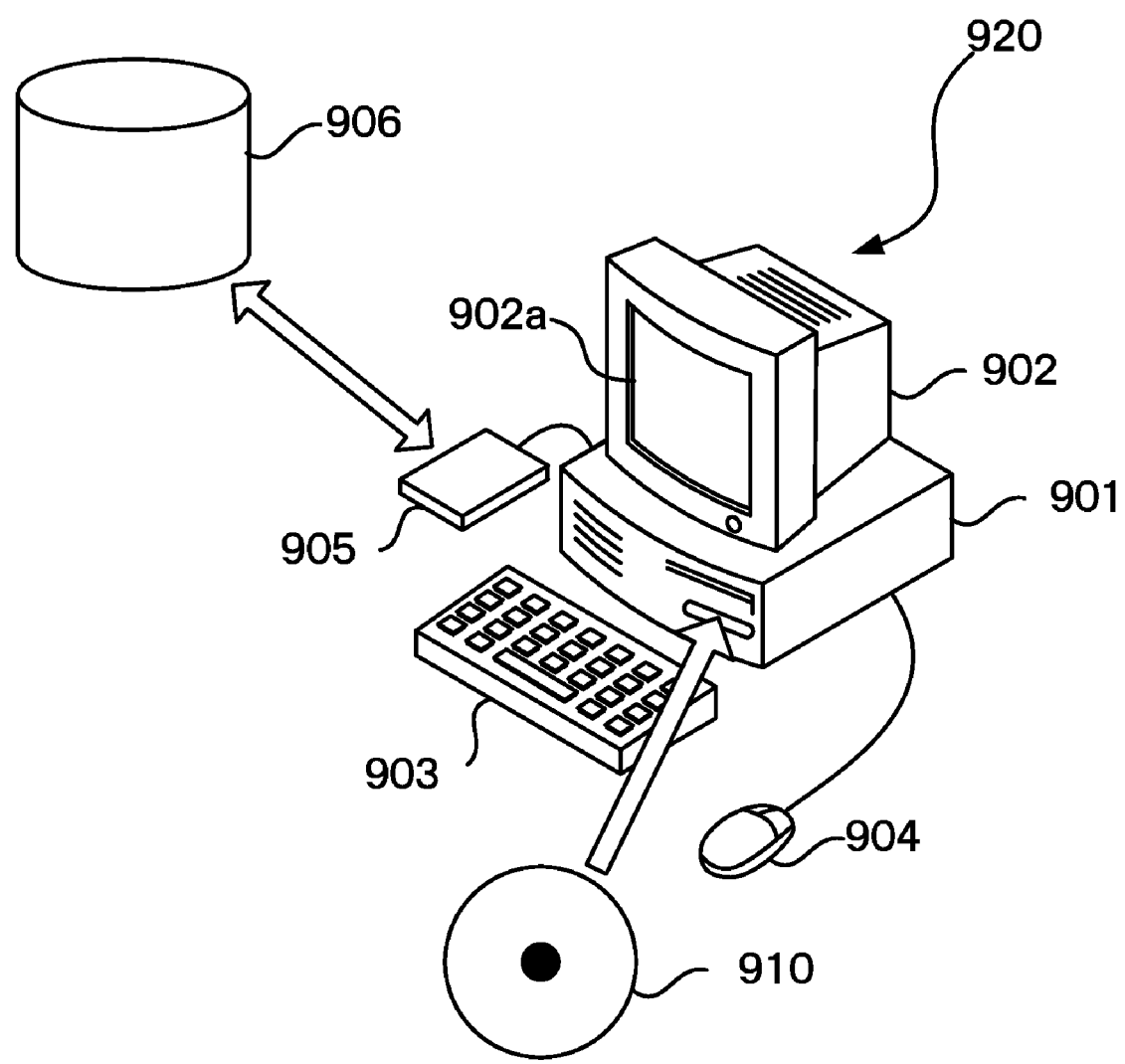
FIG. 11 is a diagram illustrating an example of a computer system to which an embodiment is applied.

The present invention can be applied in a computer system as will be described below. FIG. 11 is a diagram illustrating an example of a computer system to which the present invention is applied. A computer system 920 illustrated in FIG. 11 includes a main body section 901 in which a CPU, a disk drive, and the like, are incorporated, a display 902 which displays an image on the basis of an instruction from the main body section 901, a keyboard 903 which is used to input various information into the computer system 920, a mouse 904 which specifies an arbitrary position on a display screen 902a of the display 902, and a communication apparatus 905 which accesses an external database, and the like, to download a program, and the like, stored in the other computer system. A network communication card, a modem, and the like, are conceivable as the communication apparatus 905. Note that the computer system 920 corresponds to the library control section 11 in an embodiment.

A program, which enables each of the above described operations to be performed in the computer system configuring the tape library apparatus 1 as described above, can be provided as a maintenance program of the tape library apparatus 1. By storing the program in a recording medium which can be read by the computer system, the program can be executed by the computer system configuring the tape library apparatus 1. The program which enables each of the above described operations to be performed is stored in a portable type recording medium, such as a disk 910, or downloaded from a recording medium 906 of the other computer system via the communication apparatus 905. Further, a maintenance program of the tape library apparatus 1 (maintenance software of the tape library apparatus 1), which provides at least a maintenance function of the tape library apparatus 1 to the computer system 920, is inputted into and compiled by the computer system 920. The program makes the computer system 920 function as the tape library apparatus 1 having the maintenance function of the tape library apparatus 1.

Further, the program may also be stored in a computer readable recording medium such as, for example, the disk 910. Here, the recording medium which can be read by the computer system 920 includes an internal storage apparatus, such as a ROM and RAM, which is internally mounted in the computer, portable type storage media, such as the disk 910, a flexible disk, a DVD disk, a magneto-optical disk, and an IC card, and a database storing a computer program, or includes the other computer system, the database of the other computer system, and various recording media which can be accessed by the computer system connected via communication means, such as the communication apparatus 905.

Figure 12:
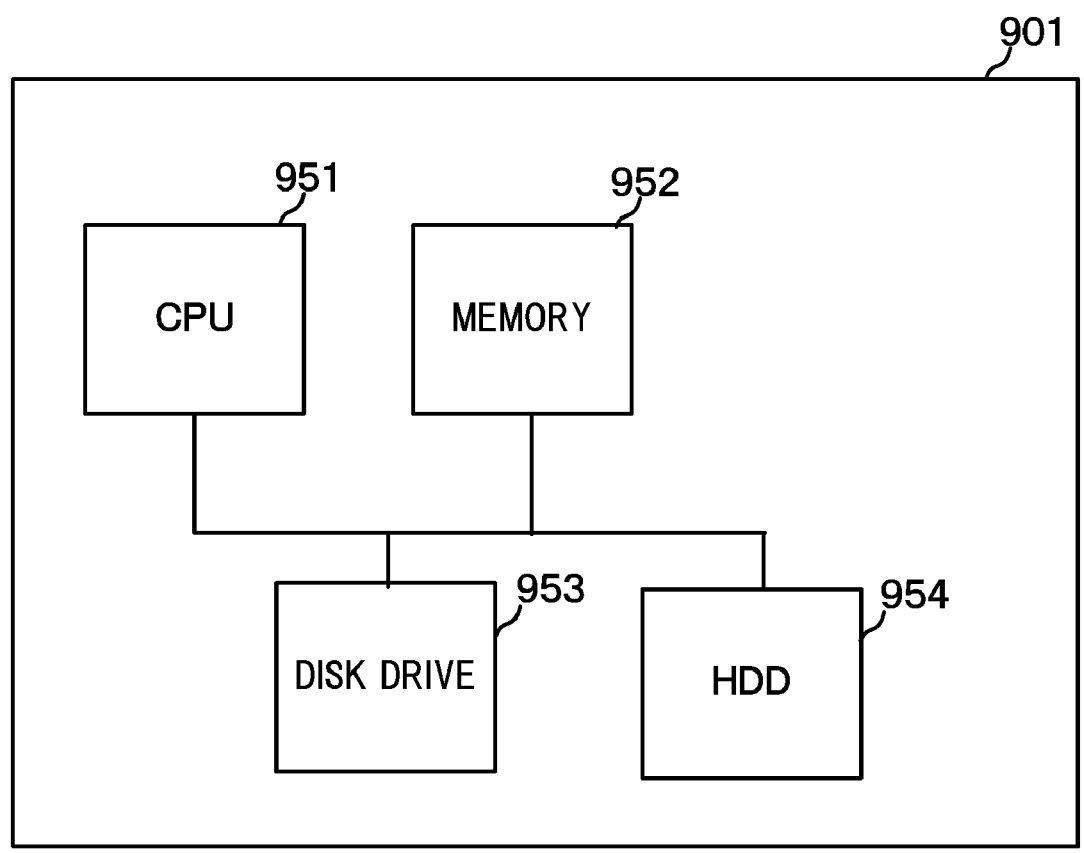
FIG. 12 is a diagram illustrating an example of a hardware configuration of a main body section in a computer system.

FIG. 12 is a diagram illustrating an example of a hardware configuration of the main body section 901 in the computer system 920. The main body section 901 includes a CPU 951, a memory 952, a disk drive 953 which reads and writes data from and to a portable type recording medium, such as the disk 910, and an HDD (Hard disk drive) 954 which is non-volatile storage means. Each of the above described function sections is realized in such a manner that the program stored beforehand in the nonvolatile storage means such as, for example, the HDD 954 and the disk 910, cooperates with the hardware resources, such as the CPU 951 and the memory 952.

According to the storage apparatus, the maintenance method of the storage apparatus, and the maintenance program of the storage apparatus, as herein disclosed, it is possible, in the case of maintenance work in which an operator may be brought into contact with a robot in operation, to prevent the contact (a conflict) between the operator and the robot in operation while maintaining the robot in an active state.

According to an embodiment, a method of controlling an apparatus is provided that includes determining a position of one of drives of a storage with respect to which a maintenance processing has started and controlling a closure of an opening of said one of drives caused during the maintenance processing based on the determining to thereby enable access to a remaining of said drives of the storage.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A storage apparatus, comprising:
at least one device insertion section into which a device can be inserted;
at least one robot which has a moving mechanism;
a replacement detection section which detects a start of a replacement of the device;
a first determination section which determines a position of the device insertion section at which the device is replaced, when detecting that the replacement of the device is started; and
a movement section which moves the robot so as to close an opening formed by a removal of the device from the device insertion section, based on the determination result of the first determination section.

2. The storage apparatus according to claim 1, wherein the replacement detection section detects the start of the replacement of the device by the removal of the device from the device insertion section.

3. The storage apparatus according to claim 1, wherein the storage apparatus comprises a plurality of robots, and
the movement section selects a robot positioned in a vicinity of the device insertion section at which the device is replaced from the plurality of robots, based on the determination result of the first determination section.

4. The control apparatus according to claim 3, comprising:
a plurality of storage media which can be accessed by the plurality of robots, for storing data;
a plurality of storage sections which can store the storage media; and
a second determination section which determines which of the robots is to be moved to close the opening so as a number of the storage media accessible by the other robot other than the robot moved to close the opening becomes larger, when determining by the first determination section that the device insertion section with the device to be replaced is located in a middle of the plurality of robots, and
wherein the movement section moves the robot based on the determination result of the second determination section, when determining by the first determination section that the device insertion section with the device to be replaced is located in the middle of the plurality of robots.

5. The control apparatus according to claim 4, comprising:
a reception section which receives an instruction from a host;
a third determination section which determines whether the instruction is an instruction according to which the other drive other than the drive to be replaced and the storage medium can be accessed by the other robot other than the robot moved to close the opening, when an instruction to convey the storage medium from the storage section to the drive or an instruction to convey the storage medium from the drive to the storage section is received by the reception section in a state where the robot is moved by the movement section so as to close the opening; and
an instruction execution section which executes the instruction, when determining by the third determination section that the instruction is an instruction according to which the other drive and the storage medium can be accessed by the other robot,
wherein the device is a drive to and from which the storage medium can be mounted and dismounted.

6. The control apparatus according to claim 5, comprising
a fourth determination section which determines whether the instruction is an instruction according to which a conveyance origin of the storage medium can be accessed by the other robot, and according to which a conveyance destination of the storage medium cannot be accessed by the other robot, when determining by the third determination section that the instruction is an instruction according to which the other drive and the storage medium cannot be accessed by the other robot,
wherein, the instruction execution section transmits to the host a response to accept the instruction, and adds the information of the instruction to a storage area in which the information can be stored, when determining by the fourth determination section that the instruction is not an instruction according to which the conveyance origin of the storage medium can be accessed by the other robot and to which the conveyance destination of the storage medium cannot be accessed by the other robot.

7. The control apparatus according to claim 6, comprising:
a fifth determination section which determines whether a predetermined time has elapsed from when the information of the instruction was added by the execution section; and
a switch section which switches the robot moved so as to close the opening to the other robot, when determining by the fifth determination section that the predetermined time has elapsed from the addition of the information of the instruction,
wherein the instruction execution section executes the instruction for which the predetermined time has elapsed after the robot moved so as to close the opening is switched to the other robot.

8. The control apparatus according to claim 6, comprising
a sixth determination section which determines whether the instruction is an instruction in which the conveyance destination of the storage medium is the other drive, when determining by the fourth determination section that the instruction is an instruction according to which the conveyance origin of the storage medium can be accessed by the other robot and according to which the conveyance destination of the storage medium cannot be accessed by the other robot,
wherein the instruction execution section conveys the storage medium to a standby place, when determining by the sixth determination section that the instruction is an instruction in which the conveyance destination of the storage medium is the other drive, and when the storage medium cannot be returned from the other drive to the original position of the storage medium in the storage section.

9. The control apparatus according to claim 8, wherein
the instruction execution section transmits to the host a response to accept the instruction, and instructs to set as the conveyance destination the drive which can be accessed by the other robot, when determining by the sixth determination section that the instruction is an instruction in which the conveyance origin of the storage medium is not the other drive but is the storage medium.

10. The control apparatus according to claim 5, comprising:
a seventh determination section which determines the position of the storage medium that is accessed by the other robot,
wherein the robot has a vertical movement section which performs vertical movement, and a horizontal movement section which performs horizontal movement and which can grasp the storage medium, and
the movement section moves the horizontal movement section of the other robot onto the same straight line as the vertical axis of the storage medium, and moves the vertical movement section of the other robot onto the same straight line as the horizontal axis of the storage medium, when determining by the seventh determination section that the position of the storage medium accessed by the other robot is on the same straight line as the horizontal axis of the horizontal movement section of the robot moved so as to close the opening.

11. The control apparatus according to claim 1, wherein
the replacement detection section detects completion of the replacement of the device, and
the movement section makes the closed state of the opening maintained by the robot until determining by the replacement detection section that the replacement of the device is completed.

12. The control apparatus according to claim 11, wherein the replacement detection section detects the completion of the replacement of the device by the insertion of the device into the device insertion section.

* * * * *

UNITED STATES PATENT AND TRADEMARK OFFICE
CERTIFICATE OF CORRECTION

PATENT NO.        : 8,213,109 B2
APPLICATION NO.   : 12/644768
DATED             : July 3, 2012
INVENTOR(S)       : Shinobu Sasaki It is certified that error appears in the above-identified patent and that said Letters Patent is hereby corrected as shown below:

Column 11, Line 8, In Claim 1, delete "storage" and insert -- control -- therefor.
Column 11, Line 22, In Claim 2, delete "storage" and insert -- control -- therefor.
Column 11, Line 26, In Claim 3, delete "storage" and insert -- control -- therefor.

Signed and Sealed this
Ninth Day of April, 2013

Teresa Stanek Rea
*Acting Director of the United States Patent and Trademark Office*